United States Patent [19]
Hudgins et al.

[11] Patent Number: 5,181,767
[45] Date of Patent: Jan. 26, 1993

[54] LUG NUT RETENTION FOR WHEEL COVER

[75] Inventors: Richard D. Hudgins, Falbrook, Calif.; Lawrence R. Sounart, Sterling Heights; Alan G. Storck, Union Lake, both of Mich.

[73] Assignee: Thompson International, Inc., Troy, Mich.

[21] Appl. No.: 785,868

[22] Filed: Nov. 1, 1991

Related U.S. Application Data

[63] Continuation of Ser. No. 559,274, Jul. 30, 1990, abandoned.

[51] Int. Cl.⁵ .............................................. B60B 7/12
[52] U.S. Cl. .................................. 301/37.37; 301/108.4
[58] Field of Search ............... 301/37 S, 37 P, 37 R, 301/108 R, 108 S, 108 A; 411/84, 85, 87, 103

[56] References Cited

U.S. PATENT DOCUMENTS

| | | | |
|---|---|---|---|
| 2,545,130 | 3/1951 | Ash | 301/9 DN X |
| 3,653,719 | 4/1972 | Osawa et al. | 301/108 S X |
| 4,768,907 | 9/1988 | Gauron | 411/85 |
| 4,842,339 | 6/1989 | Roulinson | 301/37 P X |
| 4,895,415 | 1/1990 | Stay et al. | 301/37 S |
| 4,998,780 | 3/1991 | Eshler et al. | 301/37 S |

FOREIGN PATENT DOCUMENTS 2216852 10/1989 United Kingdom ............... 301/37 S

OTHER PUBLICATIONS

Page 4 of Budd Catalog #B-261; 1961.

Primary Examiner—Russell D. Stormer
Attorney, Agent, or Firm—Reising, Ethington, Barnard, Perry & Milton

[57] ABSTRACT

A retention arrangement for a vehicular wheel cover utilizes protruding ends of the vehicle's lug studs which are received in open-bottomed wells formed in a wheel cover. Retainer nuts engage the protruding lug studs in the wells to secure the wheel cover to the wheel. Each well includes a plurality of protrusions which cooperate with the retainer nut to capture the retainer nut in the well, even when the wheel cover is not secured to the vehicular wheel.

10 Claims, 2 Drawing Sheets

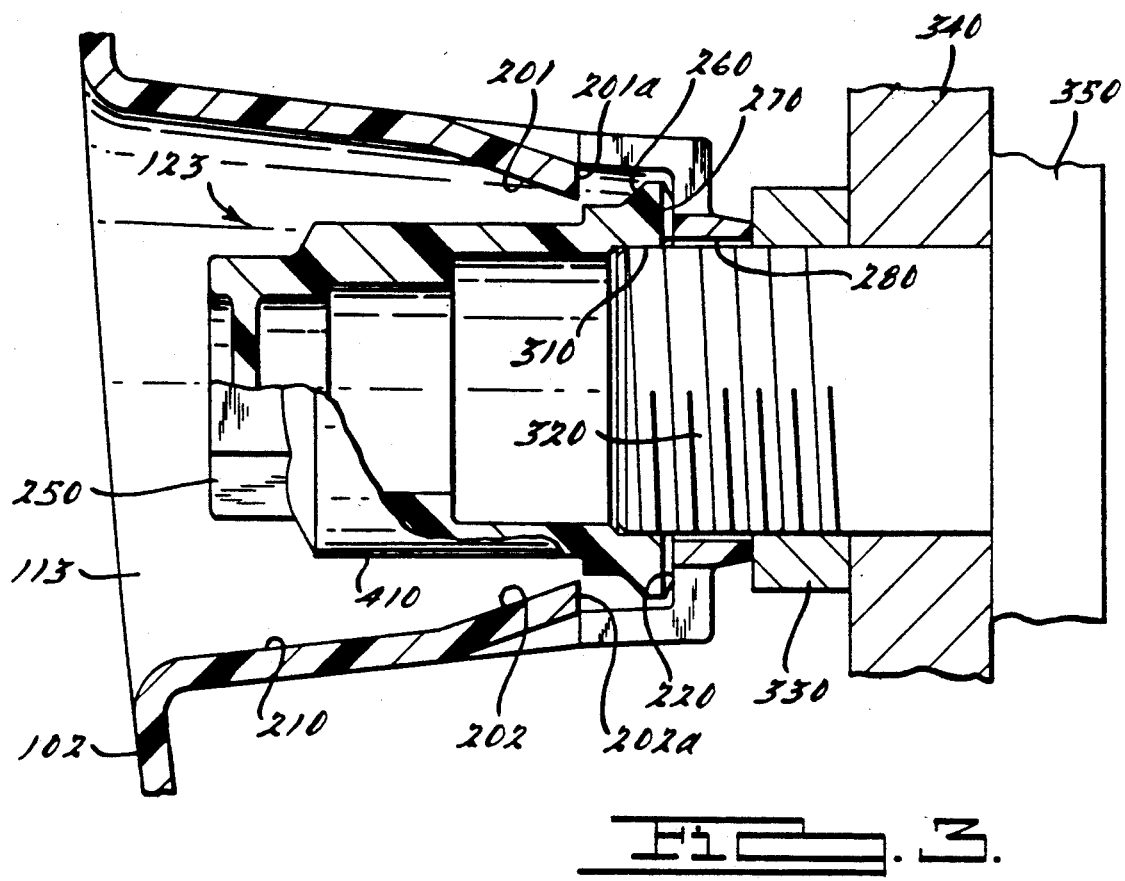
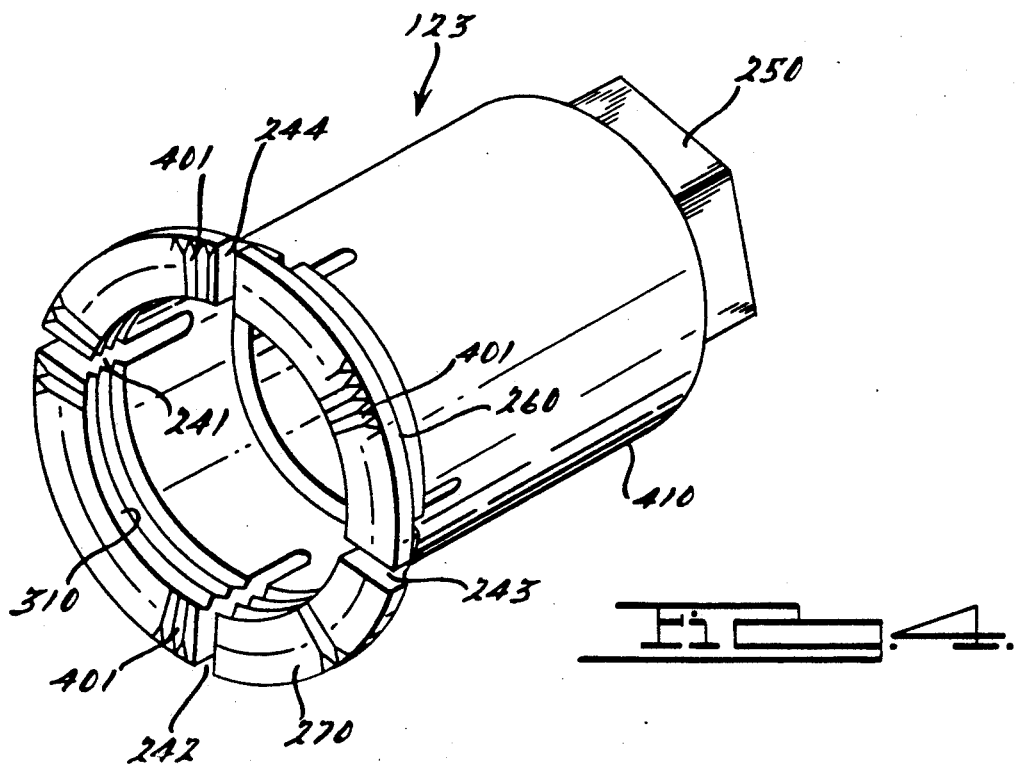

LUG NUT RETENTION FOR WHEEL COVER

This application is a continuation of application Ser. No. 559,274, filed Jul. 30, 1990, now abandoned.

BACKGROUND OF THE INVENTION

The invention relates generally to wheel cover assemblies for vehicular wheels. More specifically, the invention pertains to a retention nut capturing arrangement for such wheel covers.

It is known to provide retention arrangements for wheel covers utilizing retention nuts having an internally threaded bore for engagement with a threaded portion of a lug stud extending from a vehicle wheel mounting hub. The threaded portion of the lug stud utilized in the known arrangement extends beyond a standard tightened lug nut retaining a tire wheel to the vehicle mounting hub. In this manner, wheel covers may be mounted to a vehicle wheel following the mounting of the wheel itself to the vehicle.

While this known arrangement provides improvements in some applications over prior arrangements which relied on frictional engagement of a portion of the wheel cover with a radially inward facing annular surface of the rim portion of a wheel, it does still suffer from a disadvantage in that the wheel retaining nuts may become misplaced when the wheel cover is removed from its coupled arrangement with the lug stud of the vehicular wheel mounting hub. Therefore, the present invention is directed to an improvement over such known wheel cover retention arrangements utilizing the above described retention nut arrangement, wherein the wheel cover itself includes means for releasably capturing the mounting nuts even when the wheel cover is not coupled to a vehicular wheel.

SUMMARY OF THE INVENTION

Accordingly, a retention arrangement for a wheel cover adapted for removable engagement with a portion of at least one lug stud extending outwardly from a vehicle wheel mounting hub through a wheel includes retainer means for releasably coupling to the portion of the at least one lug stud and additionally includes receiving means on the wheel cover positioned to receive the portion of the at least one lug stud and configured to position the retainer means in a manner enabling the releasable coupling between the retainer means and the at least one lug stud, the receiving means including means for releasably capturing the retainer means on the wheel cover even when the retainer means is not coupled to the at least one stud.

BRIEF DESCRIPTION OF THE DRAWING

The objects and features of the invention will become apparent from a reading of a detailed description of a preferred embodiment, taken in conjunction with the drawing, in which:

FIG. 3 is a sectional view taken along line 3—3 of FIG. 2; and

FIG. 4 is a perspective view of one of the retainer nuts utilized in the apparatus of FIG. 1.

DETAILED DESCRIPTION

Figure 1:
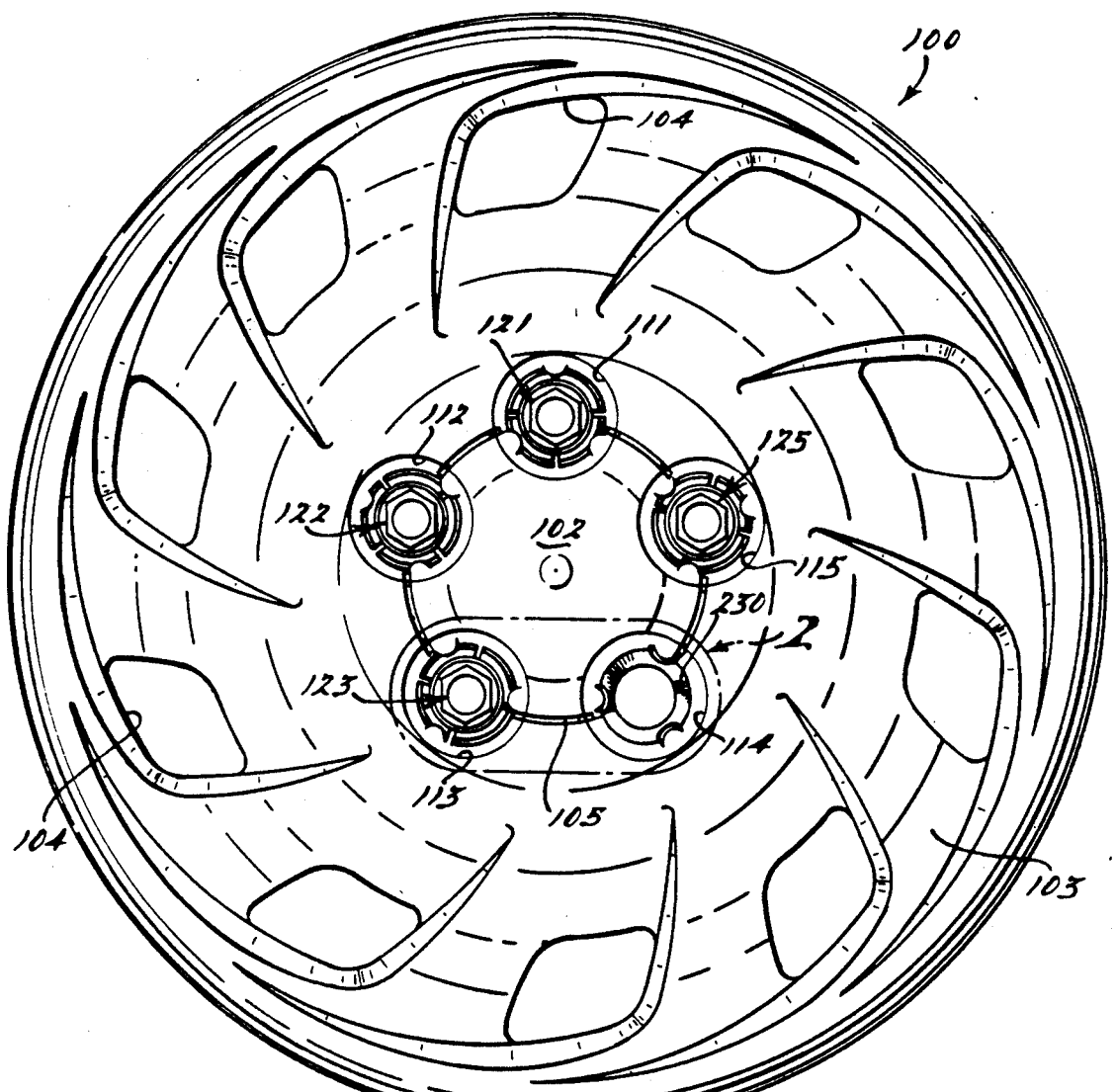
FIG. 1 is a side elevational view of a wheel cover and its coupling apparatus arranged in accordance with the principles of the invention.

With reference to the drawing FIGS. 1–4, a wheel cover assembly arranged in accordance with the invention includes a wheel cover 100 secured to a vehicular wheel 340 (FIG. 3) by a plurality, in this specific instance 5, retainer nuts 121, 122, 123, 124 (not shown for purposes of illustration) and 125 which rest in corresponding wheel cover wells 111–115 which extend inwardly toward the vehicular wheel 340 at a central portion 102 of wheel cover 100. Wells 111–115 are spaced to be in alignment with corresponding lug studs, such as stud 320 of FIG. 3, extending outwardly from a vehicle wheel mounting hub 350 (FIG. 3).

Also included in wheel cover 100 are a plurality of decorative openings with accompanying ornamental depressions 104 around a outer peripheral area 103 of wheel cover 100. Additionally shown for ornamental purposes in wheel cover 100 are a series of grooves 105 interconnecting wells 111–115. It will be seen by those skilled in the art that any one of the decorative openings 104 could additionally be utilized as a passageway for a valve stem and its cover cap of a vehicle tire associated with the wheel 340 being covered by cover 100.

Figure 2:
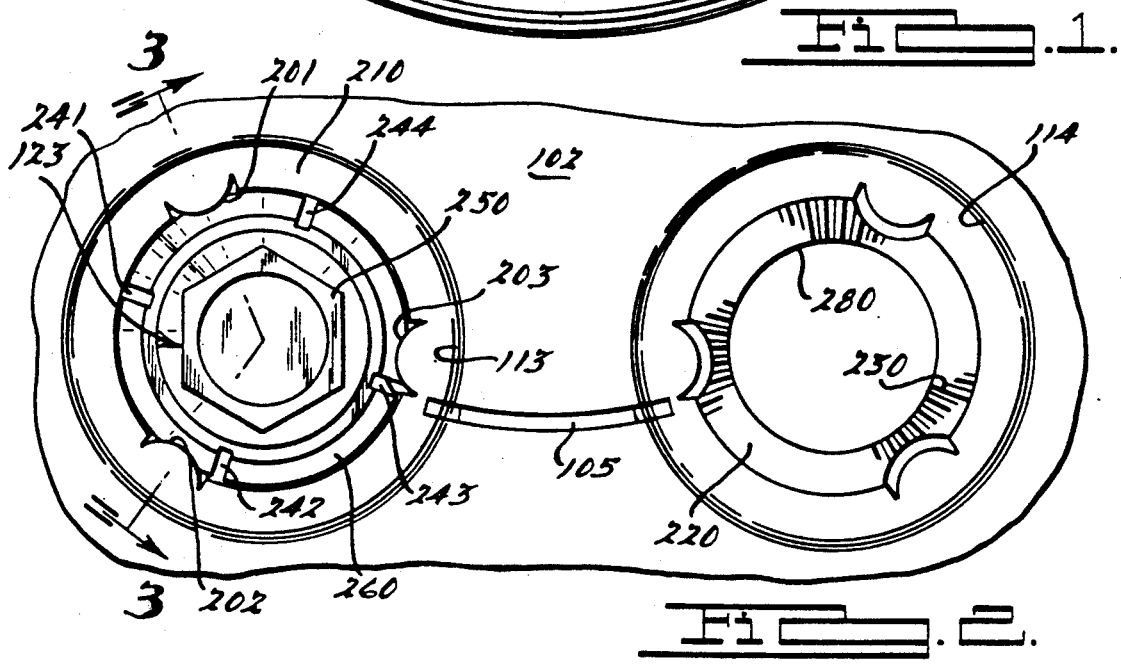
FIG. 2 is an enlarged view in the vicinity of two of the retainer wells of the arrangement of FIG. 1.

As seen more clearly from FIGS. 2 and 3, each wheel cover well 111–115 extends inwardly toward the vehicle wheel 340 from an outer surface of cover 100 along a substantially frustro-conical surface 210 to an inner lug stud opening 280 which is surrounded by a bottom retainer ledge 220. Ledge 220 carries serrations 230 which cooperate with serrations 401 (see FIG. 4) carried on a bottom surface of each retainer nut. Confronting serrations 230 and 401 inter-engage for a more positive nut tightening engagement between the bottom of a retainer nut 123 and its corresponding wheel cover well bottom ledge 220.

Extending from frustro-conical surface 210 of each well are a plurality, in this specific embodiment 3, protrusions 201, 202 and 203. As seen from FIG. 3, protrusions 201, 202 and 203 are positioned to trap a flange portion 260 of retaining nut 123 between the plurality of protrusions and bottom retainer ledge 220 of well 113. In this manner, whenever nut 123 is unscrewed from a threaded portion of lug stud 320, nut 123 will remain captured in well 113 thereby preventing misplacement of the nut.

Each nut, such as 123, carries a threaded internal bore portion 310 located interiorly of flange portion 260 for mating threaded engagement with a lug stud 320. Additionally, flange portion 260 includes a plurality, in this specific embodiment 4, of relief slots 241, 242, 243 and 244 which extend from bottom surface 270 through flange portion 260 and up into the main body 410 of each nut. These relief areas serve the purpose of imparting a sufficient degree of flexibility to flange portion 260, such that upon application of a predetermined force to the left as one views FIG. 3, nut 123 will have its flange portion 260 yield sufficiently to clear protrusions 201, 202 and 203. In this manner, the nut 123 may be removed from its corresponding well 113 in circumstances, for example, wherein the nut has been damaged must be replaced.

To summarize the retention arrangement, nut 123 has an interior threaded surface 310 matingly engaging threaded surface 320 of a lug stud, and, upon tightening of each nut such as 123, wheel cover 100 is drawn inwardly against a standard lug nut 330 which has previously attached a vehicle wheel 340 to a mounting hub 350 via lug stud 320. Even when not threadingly engaging lug stud 320, nut 123 is releasably captured within its well 113 by retaining surfaces 201a, 202a, and 203a (a surface 203a, not being specifically shown) engaging flange portion 260 of nut 123, thereby capturing nut 123 in well 113, even when threaded bore portion 310 of nut 123 is not threadingly engaging the threaded portion of lug stud 320.

A hex nut tool receiving head portion 250 of each retaining nut 123 is provided such that the retaining nut may be tightened using a standard socket wrench.

Finally, any of retaining nuts 121-125 may be forceably removed from a corresponding well 111-115 by exerting a predetermined pressure on the nut such that the flange portion 260 will yield due to the presence of release slots 241-244 enabling flange portion 260 of the nut to clear retaining surfaces 201a or 202a or 203a formed in the well wall 210.

The invention has been described with reference to details of a preferred embodiment. These details are given for the sake of example only and are not intended as limitations on the scope and spirit of the invention set forth in the appended claims.

We claim:

1. A wheel cover assembly for covering the rim portion of a vehicular wheel, said assembly comprising: a wheel cover; a lug stud opening disposed through said wheel cover for receiving a projecting threaded lug stud from a vehicular wheel; a retainer nut having a generally tubular body centered over said lug stud opening with a lower body portion engaging said wheel cover, an upper body portion, and a flange disposed about said lower body portion; an internal thread pattern disposed within said lower body portion for threadably engaging the lug stud to retain said wheel cover over the vehicular wheel; and characterized by a segmented slot intersecting said internal thread pattern and extending completely through said lower body portion and said flange with said upper body portion uninterrupted by said slot for permitting circumferential flexibility of said retainer nut in the area of said internal thread pattern and said flange.

2. An assembly as set forth in claim 1 further characterized by said retainer nut including a plurality of said slots equally spaced from one another about said body.

3. An assembly as set forth in claim 2 further characterized by said retainer nut including an annular flange extending outwarding from said bottom surface, with said expansion slots intersecting said flange.

4. An assembly as set forth in claim 2 wherein said retainer nut includes a bottom surface disposed immediately below said flange and an axially spaced upper surface, further characterized by said internal thread pattern extending axially from said bottom surface a predetermined distance and said slots extending axially from said bottom surface a greater distance than said internal thread pattern.

5. An assembly as set forth in claim 4 further characterized by a plurality of serrations disposed about said bottom surface of said retainer nut and a corresponding plurality of mating serrations disposed on said wheel cover about said lug stud opening.

6. An assembly as set forth in claim 4 further characterized by a tool engaging portion disposed on said upper surface of said retainer nut.

7. As assembly as set forth in claim 1 further characterized by said wheel cover including a protrusion extending from said wheel cover adjacent said lug stud opening for obstructing movement of said flange therepast.

8. An assembly as set forth in claim 7 further characterized by said wheel cover including a well portion generally centered about and extending outwardly from said lug stud opening.

9. An assembly as set forth in claim 8 further characterized by said protrusion extending radially from said well portion.

10. An assembly as set forth in claim 9 further characterized by including three of said protrusions disposed in equal arcuate increments about said well portion.

* * * * *